March 22, 1955     A. E. QUEST     2,704,677
IRRIGATION SYSTEM
Filed Dec. 7, 1951
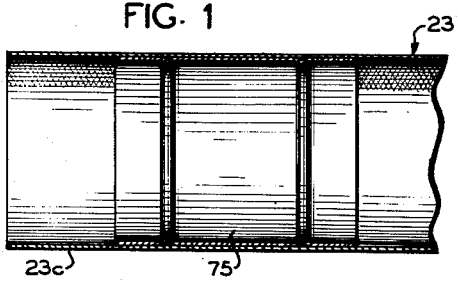
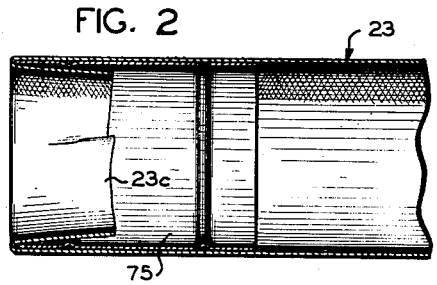
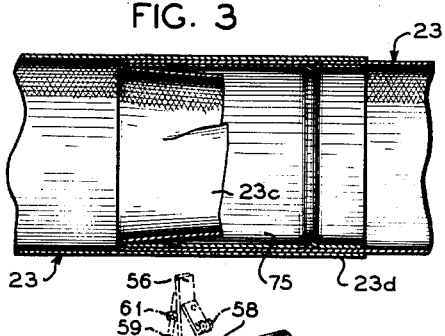
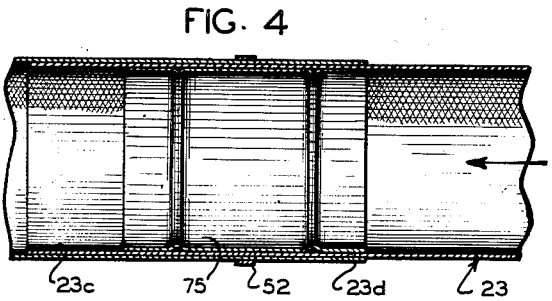
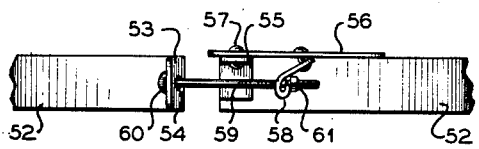
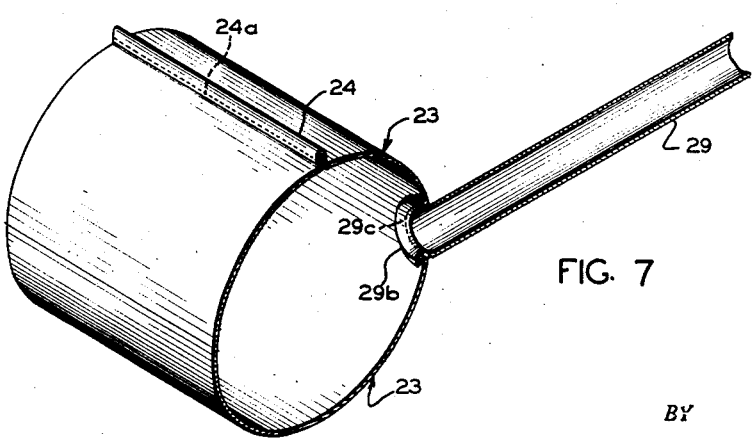
INVENTOR.
A. E. QUEST
BY
A. Yates Dowell
ATTORNEY

United States Patent Office 2,704,677
Patented Mar. 22, 1955

2,704,677

IRRIGATION SYSTEM

Arthur E. Quest, Lubbock, Tex.

Application December 7, 1951, Serial No. 260,393

2 Claims. (Cl. 285—77)

This invention relates to irrigation apparatus and systems, and more particularly to a novel liquid tight joint and method of providing such a joint between lengths of flexible hose or tubing to provide an irrigation system of inherent flexibility and maximum efficiency.

This application is a continuation-in-part of my co-pending application Serial No. 162,921, filed May 19, 1950, for "Flexible Pipe," now Patent 2,595,408.

Irrigation systems commonly employed generally provide a fixed or located conduit for carrying water from a source of supply to the terrain to be irrigated, outlets being provided to convey the water from the main conduit to desired channels. Such systems are first costly to install and, second, are devoid of flexibility being controlled by head gates or valves operable to control diversion of water into desired localities.

Such systems, being fixed in location, must be planned and installed to fit each location, and, once in operation, are both troublesome and costly to change. It is accordingly a major object of the present invention to provide an irrigation system which will be portable in nature and which may be readily moved from place to place in accordance with required conditions and the convenience of the user.

It is a further object of the invention to provide a novel irrigation system which requires no installation other than a simple placing upon the surface of the ground or, if desired, the placing within a suitable trench or the like, the system including a conduit which will be flexible in all directions, requiring no supporting means of any character.

It is a further object of the invention to provide a novel conduit of the class set forth comprising a plurality of lengths of flexible hose or tubing which may be readily and conveniently assembled, in substantially end to end relationship, to provide any over-all length required or desired.

It is a still further object of the invention to provide a novel conduit of the class set forth including flexible, spaced outlets or sleeves with novel means for mounting such outlets upon the conduit.

It is a further object of the invention to provide, in an irrigation system of the class set forth, novel means for assembling lengths of flexible tubing or pipe whereby the possibility of leakage at the points of assembly will be substantially obviated.

It is a still further object of the invention to provide a novel combination of substances for impregnating lengths of flexible pipe of the class with which we are presently concerned whereby the effective life of the article will be increased substantially and the likelihood of the adherence thereto of foreign matter will be materially lessened.

Further objects and advantages of the invention will be apparent from the following specification taken in conjunction with the accompanying drawing, wherein:

Fig. 1 is a detail sectional view illustrating the initial step in a novel method of assembly of adjacent extremities of conduit sections;

Fig. 2, a detail sectional view similar to Fig. 1, illustrating the second step in a novel method of assembly of adjacent extremities of conduit sections;

Fig. 3, a detail sectional view, also similar to Fig. 1, illustrating the third step in a novel method of assembly of adjacent extremities of conduit sections;

Fig. 4, a detail sectional view illustrating the completed assembly of adjacent extremities of aligned conduit sections;

Fig. 5, a detail perspective of a novel clamp employed for securing adjacent extremities of aligned conduit sections upon a tubular coupling member;

Fig. 6, a fragmentary top plan view of a portion of the clamping member illustrated in Fig. 5; and Fig. 7, a fragmentary perspective view, partly in section, illustrating a method of assembly of conduit section and outlet sleeve.

As shown in the drawings, the novel conduit sections and sleeves of the instant invention are formed from any suitable flexible material, such as canvas or the like. It will be understood, however, that the invention is by no means limited to the use of canvas, and other materials such as synthetic fabrics and/or plastics may be conveniently employed. Where fabric is utilized, such as the canvas illustrated, the material is preferably impregnated with a suitable waterproofing compound or otherwise rendered substantially impervious to the passage of fluid, as is well known in this and related arts.

It has been found particularly advantageous to impregnate canvas materials from which the pipe or conduit sections and distributing sleeves of the present invention may be formed with a paraffin solution. Such a preparation enters into the interstices of the fabric and provides a smoothened, waxy surface which is repellent as against adherence thereto of foreign matter. Thus, when an irrigation system embodying conduit sections impregnated in this manner remains upon the ground for a substantial period of time, adherence thereto of dirt or mud is inhibited and the disassembly and cleaning of the sections of the system for moving, storage or other purposes is particularly simplified.

After such paraffin impregnations, the material is further impregnated with copper napthanate, it having been found that this latter impregnation imparts extreme characteristics of resistance to deterioration through exposure to the elements as well as to such impurities as may be present in the water distributed. The copper napthanate impregnation has no obvious or apparent effect on the waxy surface previously obtained and tests conducted with material impregnated in the manner related hereabove have disclosed superior characteristics far in excess of those obtained in accordance with prior art practices.

It will be obvious upon reference to my Patent 2,595,408 that there has thus been formed, from a single length of flat material, a tubular conduit section 23 which, when distended as indicated in Fig. 7 of the drawing, includes a longitudinally stitched folded portion or rib 24 extending to approximately eighteen inches from each extremity of the conduit section. The free, overlapping portions of material adjacent the extremities of the conduit section are then stitched to each other providing a substantially smooth interior and exterior surface with a flat seam adjacent each extremity of the conduit section.

As has been previously stated, length and diameter of the required conduit sections are first determined and, simultaneously, length and diameter of outlet sleeves 29, intended to be secured to each conduit section in communication with the interior thereof, are also determined. It will be understood that these outlet sleeves, which project or extend laterally from the conduit sections, are of substantially smaller diameter and length than said conduit sections.

Where hydrants are available as a source of supply, the inlet extremity of a conduit section 23 may be secured in surrounding relationship upon a discharge pipe or fitting of a hydrant provided with a suitable valve for controlling flow therefrom.

Any desired form of clamping means may be employed, as is well known in this and related arts, for insuring a fluid-tight connection between the conduit section and hydrant. One form of such clamping means has been illustrated more particularly in Figs. 5 and 6 of the drawing and comprises a split metallic ring 52 provided on one extremity thereof with an upstanding ear 53 having an aperture 54 located substantially centrally thereof. The opposed extremity of the ring 52 is provided with an upstanding lug 55 located at right angles to the ear 53. A locking lever 56 has one extremity thereof pivotally mounted upon the lug 55 as indicated at 57 and the lever 56 is provided intermediate the extremities thereof with a pivotally mounted bifurcated retaining member 58. A threaded bolt 59 is positioned within the aperture 54, the bolt head 60 preventing passage therethrough. The free extremity of the bolt 59 is received within the bifurcated retainer 58, and an interiorly threaded nut 61 is drawn up upon the bolt 59 as illustrated in Fig. 6 of the drawings.

The operative positioning of this type of clamping means is particularly simple. The split ring 52 is positioned upon the extremity 23a of the conduit section in surrounding relationship with respect thereto, the conduit extremity is adopted to be placed upon a hydrant outlet. In unlocked position, the lever 56 of split metallic ring clamp 52 is in the substantially vertical position illustrated in dotted lines in Fig. 5, the bolt 59 being received within the bifurcated member 58. The lever 56 is then moved about its pivot to locked position, illustrated in full lines in Fig. 5, thus bringing the extremities of the split ring toward each other and clamping the ring upon the conduit section. Final tightening is accomplished by adjustment of the nut 61.

Some of the conduit sections 23 are provided with outlet sleeves 29 (Fig. 7). Each outlet sleeve 29 may be manufactured in substantially the manner described in my prior patent or from a preformed length of substantially impervious flexible material.

The inner extremity 29b of an outlet sleeve is received within an aperture provided in the conduit section and said inner extremity is securely stitched as indicated at 29c or otherwise secured to the material of the conduit section immediately adjacent the associated aperture, a fluid-tight joint thus being provided.

The novel and preferred method of assembly of adjacent conduit sections has been illustrated in detail in Figs. 1 through 4 of the drawing. The initial step in such method of assembly comprises the insertion of a rigid tubular coupling member 75 into an extremity of a conduit section 23 with the free extremity 23c of said conduit section projecting beyond the outer end of said coupling member. It will be understood that the length of the coupling member may be varied within reasonable limits, however, an approximate length of twelve inches has been found to be admirably suited for present purposes. Desirably, the coupling member 75 is inserted into the conduit section 23 so that the free end of this conduit section extends beyond the outer end of the coupling member for a distance approximating one-half the length of the coupling member, in the present instance approximately five to six inches.

This projecting extremity 23c is then bent reversely upon itself and positioned within the confines of the coupling member, as illustrated more particularly in Fig. 2 of the drawing, for a purpose to be described more fully hereinafter.

The extremity of this conduit section, with the coupling member 75 positioned therein, is then inserted into the opposed extremity 23d of the aligned and adjacent conduit section 23 a distance substantially equal to the length of said coupling member. Thus, the extremities of adjacent conduit sections are in surrounding overlapped or superimposed relationship with respect to the coupling member and with the extremity 23c of the innermost conduit section within the confines of said coupling member, as particularly illustrated in Fig. 3 of the drawing.

Any clamping means may now be employed to secure the overlapped conduit sections upon the coupling member 75, desirably a clamp 52 being employed for this purpose. For convenience of assembly, the clamping member or split ring 52 may be formed in two sections, hingedly connected as indicated 52a.

After the intake extremity of initial conduit section has been secured to the source of water supply, and a sufficient number of conduit sections have been assembled to constitute the irrigation unit required, flow of water is then introduced into the assembled conduit in a direction opposite to that of the reversely bent extremities 23c of the several conduit sections, this direction of flow being indicated by the arrow appearing on Fig. 4. The force of this flow of water will restore each reversely bent extremity 23c to its original direction in substantial alignment with the conduit section 23 of which it is a part.

Such an association of parts has been illustrated in Fig. 4 of the drawings where a completed joint is shown. It will be noted that the projecting extremity 23c lies in closely abutting contact with the inner surface of the adjacent conduit section, thus providing a second efficient seal between adjoining conduit sections. Such an assembly has been found in practice to be particularly satisfactory, possibility of seepage or leakage at joints being effectively prevented.

There has thus been described an irrigation system and apparatus having a degree of flexibility heretofore unknown in this art. Conduit sections and laterally disposed outlet sleeves are fabricated in a particularly simple manner, from preformed pieces of material especially tailored to meet any required conditions. The over-all length of the system is of little importance or concern since as many sections as required may be readily coupled or united, it being contemplated that the extremity of the section remote from the source of supply will be provided with an adequate control designed to prevent unauthorized passage and loss of water therethrough.

The nature of the terrain upon which the system is installed is of no importance since the flexible material from which conduit sections and outlet sleeves are fabricated permit of installation in complete conformation with topographical conditions and with no requirement for supporting means of any character.

The system may be as readily installed in a geometrically straight line as in an undulating path. It may wind through an orchard, or the like, providing proper irrigation for each tree therein or it may be employed in connection with crops of any character where planting has been carefully planned in accordance with conditions of surface contour.

A single section may be easily replaced, with no necessity for disturbing the entire system. No problems of weight are provided, whereby portability of the system is restricted and, where storage during the winter season is desirable, the collapsible nature of each section obviates any requirement for substantial storage space. An economy of manufacture, installation, and maintenance is provided resulting in an improved irrigation system of maximum efficiency without regard to the size thereof.

It will be understood that various changes may be made in the invention without departing from the spirit and scope thereof and therefore the invention is not limited by that which is illustrated in the drawings and described in the specification but only as indicated in the appended claims.

What is claimed is:

1. A method of connecting adjacent extremities of flexible conduit sections including the steps of inserting a rigid tubular coupling member within one of said conduit sections with the free extremity of said conduit section projecting beyond the outer end of said coupling member, bending said projecting free extremity reversely within the confines of said coupling member, inserting the extremity of said conduit section into the extremity of an adjacent conduit section a distance substantially equal to the length of the coupling member within said first mentioned conduit section so that the adjacent extremities of said conduit sections are overlapped upon said coupling member in surrounding relationship thereto, clamping said overlapped extremities upon said coupling member, and introducing liquid pressure into said connected conduit sections in a direction opposite to that of the reversely bent extremity of said first mentioned conduit section whereby said bent extremity will be restored to substantial alignment with said first mentioned conduit section and a seal will be effected between said projecting extremity and the inner wall of the adjacent conduit section.

2. An irrigation system comprising at least two flexible and collapsible conduits of substantially the same diameter with one end of the first conduit received in one end of the second conduit in telescoping relation, said one end of each of said first and second conduits being generally free from projections on their interior and exterior surfaces, a substantially cylindrical sleeve snugly received within the telescoping ends of said conduits and with the extremity of said one end of said first conduit projecting beyond the adjacent end of said sleeve, said sleeve being sufficiently strong and rigid to maintain the conduits in expanded and engaging relation, a clamp surrounding the sleeve and the overlapping ends of said first and second conduits and having means for completely opening for lateral application to the conduits, and means to tighten the clamp around said conduits and sleeve providing a liquid tight joint between said conduits, the projecting extremity of said first conduit being arranged on the downstream side in the direction of flow of liquid providing an additional seal for said joint between said conduits.

References Cited in the file of this patent

UNITED STATES PATENTS

| | | |
|---|---|---|
| 1,143,351 | Benson | June 15, 1915 |
| 1,211,085 | Chandler | Jan. 2, 1917 |
| 1,381,427 | Patrick | June 14, 1921 |
| 1,989,427 | Robey | Jan. 29, 1935 |
| 2,253,727 | Sample | Aug. 26, 1941 |
| 2,595,408 | Quest | May 6, 1952 |